United States Patent
Hsiao

(10) Patent No.: US 8,380,920 B2
(45) Date of Patent: Feb. 19, 2013

(54) FLASH STORAGE DEVICE AND DATA ACCESS METHOD OF FLASH MEMORY

(75) Inventor: Wei-Yi Hsiao, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 274 days.

(21) Appl. No.: 12/955,726

(22) Filed: Nov. 29, 2010

(65) Prior Publication Data

US 2011/0179217 A1    Jul. 21, 2011

(30) Foreign Application Priority Data

Jan. 20, 2010 (TW) ................................ 99101462 A

(51) Int. Cl.
*G06F 12/00* (2006.01)
*G06F 12/02* (2006.01)
(52) U.S. Cl. . 711/103; 711/165; 711/173; 711/E21.001; 711/E12.008; 710/3

(58) Field of Classification Search .................. 711/103, 711/165, 173, E12.001, E12.008
See application file for complete search history.

(56) References Cited

U.S. PATENT DOCUMENTS

2005/0055532 A1 *  3/2005  Yu ................................ 711/203

* cited by examiner

*Primary Examiner* — Yong Choe
(74) *Attorney, Agent, or Firm* — McClure, Qualey & Rodack, LLP

(57) ABSTRACT

The invention provides a data access method of a flash memory. First, a write command, a write address, and target data are received from a host. A target block corresponding to the write address is then determined from the flash memory. Whether a storage space corresponding to the write address in the target block has stored data therein is then determined. When the storage space of the target block does not have stored data therein, the target data is written into the storage space of the target block. When the storage space of the target block does have stored data therein, whether a child block mapped to the target block exists in the flash memory is determined. When the child block exists in the flash memory, the target data is written into the child block.

18 Claims, 7 Drawing Sheets

| Receiving order | Command | Write address range | Target data |
|---|---|---|---|
| 1 | Write command 1 | 101~200 | Data H |
| 2 | Write command 2 | 201~300 | Data I |
| 3 | Write command 3 | 251~400 | Data J$_1$ (251~300), Data J$_2$ (201~400) |
| 4 | Write command 4 | 451~500 | Data K |
| 5 | Write command 5 | 401~500 | Data M |

FIG. 4A

| Update address table | |
|---|---|
| Original data address | Update data address |
| 0 | |
| 1 | |
| 2 | |
| ... | ... |
| 998 | 353 |
| 999 | 354 |
| 1000 | |

FIG. 5

FLASH STORAGE DEVICE AND DATA ACCESS METHOD OF FLASH MEMORY

CROSS REFERENCE TO RELATED APPLICATIONS

This Application claims priority of Taiwan Patent Application No. 099101462, filed on Jan. 20, 2010, the entirety of which is incorporated by reference herein.

BACKGROUND OF THE INVENTION

1. Field of the Invention

The invention relates to memories, and more particularly to flash memories.

2. Description of the Related Art

A flash memory comprises a plurality of blocks. Each block comprises a plurality of pages for data storage. When the flash memory receives a write command from a controller, the flash memory must write received data to at least one block thereof according to a write address. When the flash memory receives a read command from the controller, the flash memory must read data from at least one block thereof according to a read address.

When a page of a flash memory stores data, the page cannot be written with new update data before the original data stored in the page is erased. Because a flash memory erases data in a unit of a block, the data stored in all pages of a block must be erased together. Thus, erasing data from a block requires a long time period, and a controller cannot erase data from a flash memory with a high frequency.

When a host sends a write command to a controller to write new data to a write address, if the pages of a target block corresponding to the write address store original data, the controller cannot directly write the new data to the pages of the target block. The controller, however, must execute the write command received from the host. The controller therefore obtains a spare block from the flash memory to store the new data. Because the new data stored in the spare block is mapped to the write address as the original data stored in the target block, there is a mapping relationship between the target block and the spare block. The target block is therefore referred to as a mother block, and the spare block is therefore referred to as a child block mapped to the mother block for storing update data for the mother block.

Referring to FIG. 1, a mother block 102 and a child block 104 of a conventional mapping relationship is shown. The mother block 102 comprise pages mapped to a logical address range of 0~1000 and has original data $A_0$, $B_0$, $C_0$, and $D_0$ stored therein. When a host sends a first write command to a controller to request the controller to write update data $B_1$ to the address range 400~600, the space corresponding to the address range 400~600 in the mother block 102 has stored original data $B_0$ and cannot store the update data $B_1$. The controller then selects a spare block from the flash memory as the child block 104 mapped to the mother block 102, copies the data $A_0$ corresponding to an address range 0~400 to the address range 0~400 of the child block 104, and writes the update data $B_1$ to the address range 400~600 of the child block 104. Similarly, if the host sends a second write command to the controller to request the controller to write update data $C_1$ to an address range 601~700, because the space corresponding to the address range 601~700 in the mother block 102 has stored original data $C_0$, the controller directly writes the update data $C_1$ to the address range 601~700 of the child block 104.

If the host sends a third write command to the controller to request the controller to write new data to an address range 0~700, because the space corresponding to the address range 0~700 in the child block 105 has stored data $A_0$ and update data $B_1$ and $C_1$, the controller cannot write the new data to the child block 104 to execute the third write command of the host. Thus, a data access method of a flash memory is required to solve the aforementioned problem.

BRIEF SUMMARY OF THE INVENTION

The invention provides a data access method of a flash memory. First, a write command, a write address, and target data are received from a host. A target block corresponding to the write address is then determined from the flash memory. Whether a storage space corresponding to the write address in the target block has stored data therein is then determined. When the storage space of the target block does not have stored data therein, the target data is written into the storage space of the target block. When the storage space of the target block does have stored data therein, whether a child block mapped to the target block exists in the flash memory is determined. When the child block exists in the flash memory, whether the write address follows a last address with stored data in the child block is determined. When the write address follows the last address, the target data is written into the child block. When the write address does not follow the last address, whether a file allocation table (FAT) block mapped to the target block exists in the flash memory is determined. When the FAT block exists in the flash memory, the target data is written to the FAT block.

The invention also provides a flash storage device. In one embodiment, the flash storage device comprises a flash memory and a controller. The flash memory comprises a plurality of blocks for data storage. The controller receives a write command, a write address, and target data from a host, determines a target block corresponding to the write address from the flash memory, checks whether a storage space corresponding to the write address in the target block has stored data therein, writes the target data into the storage space of the target block when the storage space of the target block does not have stored data therein, checks whether a child block mapped to the target block exists in the flash memory when the storage space of the target block does have stored data therein, checks whether the write address follows a last address with stored data in the child block when the child block exists in the flash memory, writes the target data into the child block when the write address follows the last address, checks whether a file allocation table (FAT) block mapped to the target block exists in the flash memory when the write address does not follow the last address, and writes the target data to the FAT block when the FAT block exists in the flash memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4A is an embodiment of a series of write commands sent from a host to a flash storage device;

FIG. 5 is an embodiment of an update address table stored in an FAT block according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
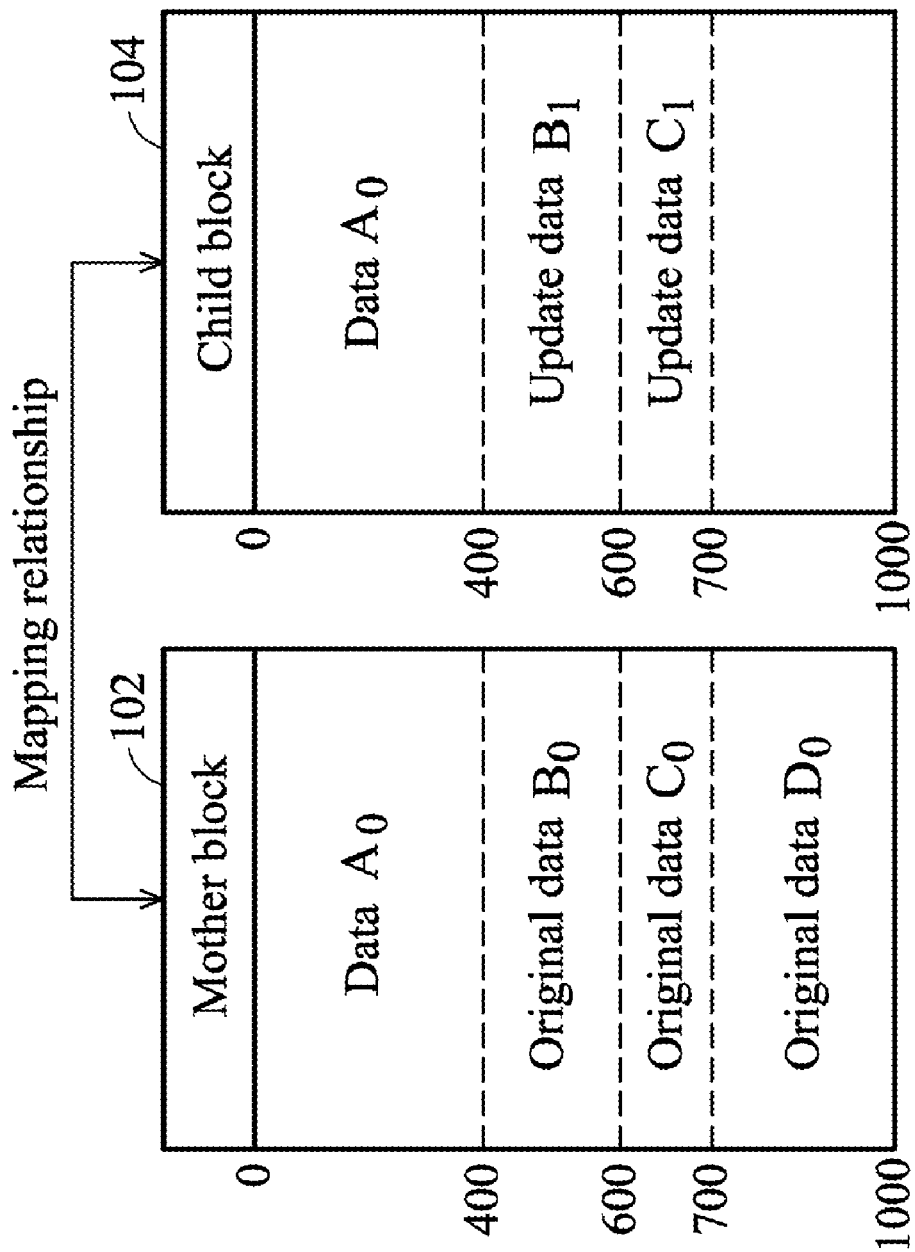
FIG. 1 shows a mother block and a child block of a conventional mapping relationship.
Figure 2:
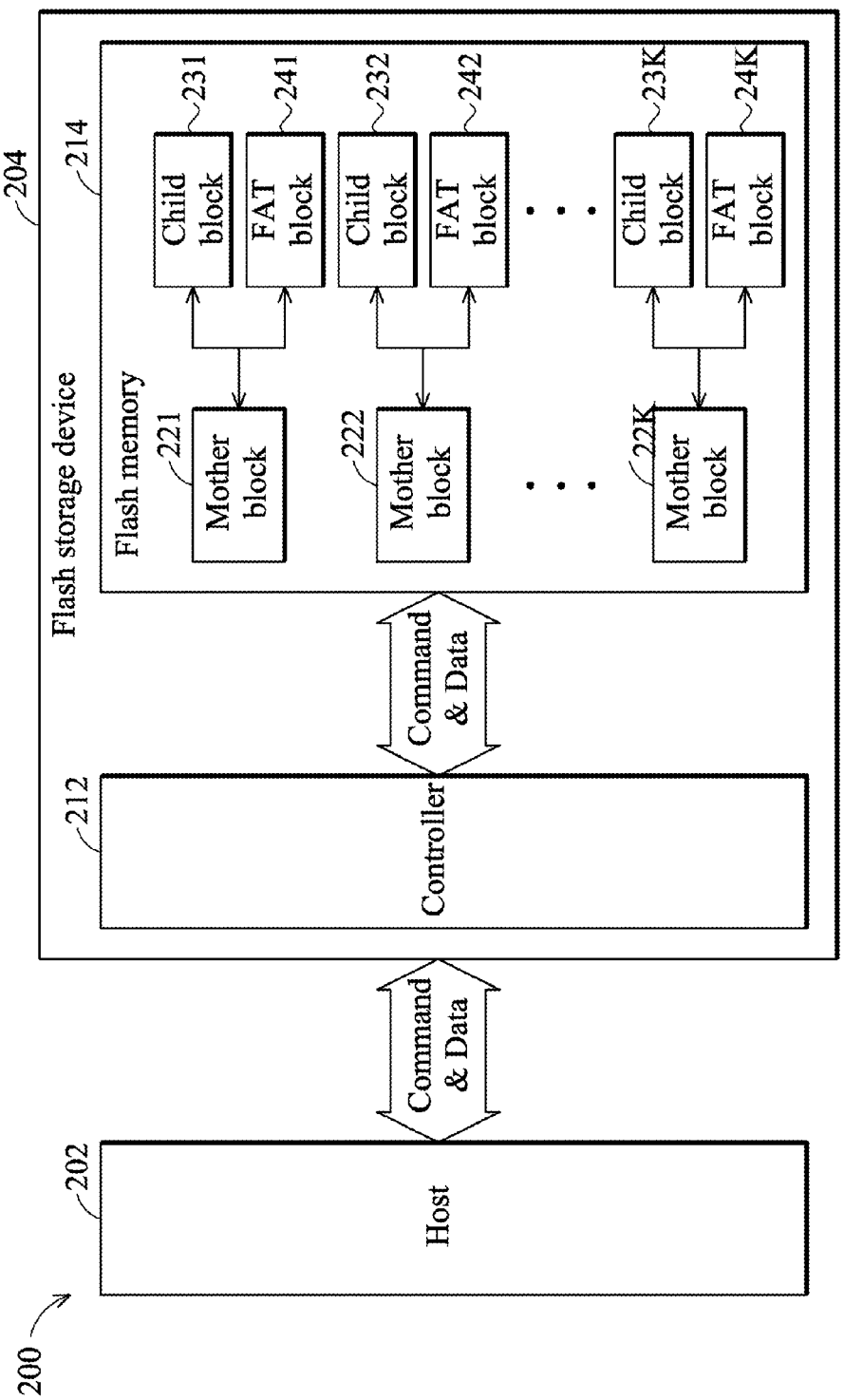
FIG. 2 is a block diagram of a data storage system according to the invention.

Referring to FIG. 2, a block diagram of a data storage system 200 according to the invention is shown. The data storage system 200 comprises a host 202 and a flash storage device 204. The flash storage device 204 stores data for the host 202. In one embodiment, the flash storage device 204 comprises a controller 212 and a flash memory 214. The flash memory 214 comprises a plurality of blocks. Each block comprises a plurality of pages for data storage. When the host 202 sends a write command to the flash storage device 204, the controller 212 writes data to the flash memory 214 according to the write command. When the host 202 sends a read command to the flash storage device 204, the controller 212 read data from the flash memory 214 according to the read command.

When an address range of a target block of the flash memory 214 has stored data, and the host 202 requests the flash storage device 204 to write update data to the address range, the controller 212 cannot directly write the update data to the original address range of the target block of the flash memory 214. The controller 212 therefore selects a spare block from the flash memory 214 as a child block corresponding to the target block to store the update data. The target block is referred to as a mother block in reference to the child block. When the host 202 requests the flash storage device 204 to write new update data to the address range again, the controller 212 cannot directly write the new update data to the target block or the child block of the flash memory 214.

The controller 212 then selects a spare block from the flash memory 214 as a file allocation table (FAT) block corresponding to the target block, and then writes the new update data to the FAT block. As shown in FIG. 2, the mother block 221, the child block 231, and the FAT block 241 correspond to a single logical address range, and the mother block 22K, the child block 23K, and the FAT block 24K correspond to another logical address range. An FAT block has a different data storage format from that of the child block. The child block stores update data with continuous addresses, and the FAT block stores update data of discontinuous addresses. The child block cannot store two update data segments with the same addresses, but the FAT block can store more than two update data segments with the same addresses. The data storage format of the FAT block is further illustrated in detail with FIGS. 4A, 4B, and 5.

Figure 3:
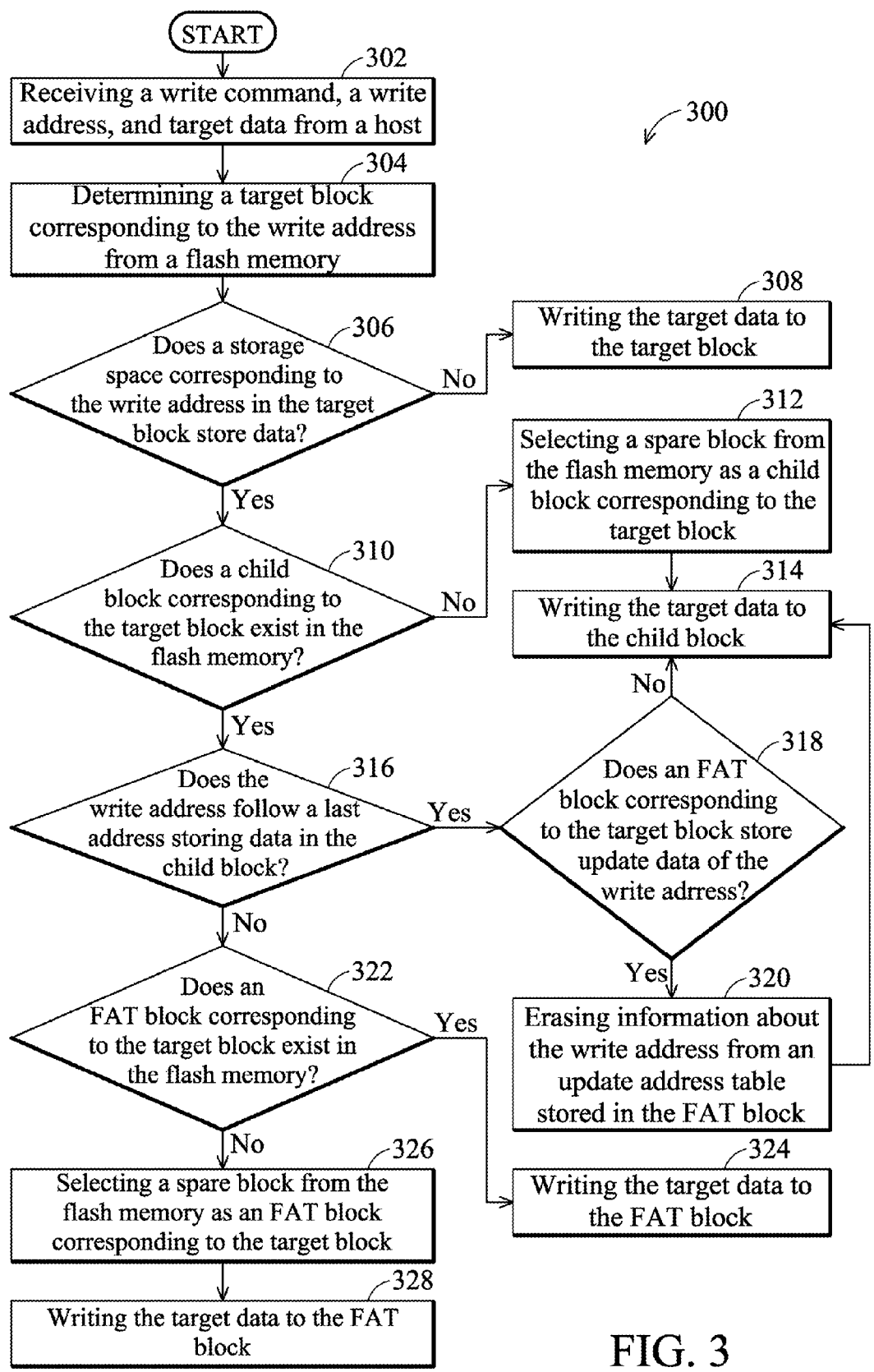
FIG. 3 is a flowchart of a data access method of a flash memory according to the invention.

Referring to FIG. 3, a flowchart of a data access method 300 of a flash memory according to the invention is shown. The controller 212 executes write commands received from the host 202 according to the method 300. First, the controller 212 receives a write command, a write address, and target data from the host 202 (step 302). The controller 212 then determines a target block corresponding to the write address from a plurality of blocks of the flash memory 214 (step 304). The controller 212 then determines whether a storage space corresponding to the write address in the target block has stored data therein (step 306). If not, the controller 212 directly writes the target data to the storage space of the target block (step 308).

If the storage space corresponding to the write address in the target block stores data (step 306), the controller 212 cannot write the target data to the storage space of the target block. The controller 212 then determines whether a child block mapped to the target block exists in the flash memory (step 310). If not, the controller 212 selects a spare block from the flash memory as a child block corresponding to the target block (step 312), and writes the target data to the child block (step 314). On the contrary, if the child block mapped to the target block exists in the flash memory (step 310), the controller 212 determines whether the write address of the target data follows a last address for storing data in the child block (step 316).

If the write address of the target data follows a last address for storing data in the child block (step 316), the controller 212 directly writes the target data to the child block (step 314). After the target data is written to the child block, the controller 212 further determines whether an FAT block mapped to the target block exists in the flash memory 204 (step 318). If the FAT block exists and the FAT block has stored update data corresponding to the write address (step 318), the controller 212 further erases information about the write address and the update data from an update address table stored in the FAT block (step 320).

If the write address of the target data does not follow the last address for storing data in the child block (step 316), the controller 212 further determines whether an FAT block mapped to the target block exists in the flash memory 204 (step 322). If so, the controller 212 directly writes the target data to the FAT block (step 324). If not, the controller 212 selects a spare block from the flash memory 204 as an FAT block mapped to the target block (step 326), and writes the target data to the FAT block (step 328). After the controller 212 writes the target data to the FAT block (steps 324, 328), the controller 212 also writes an update address table to the FAT block, wherein the update address table records a mapping relationship between an original physical address of an original data stored in the target block and an update physical address of the target data stored in the FAT block, and both the original data and the target data logically correspond to the write address.

Figure 4B:
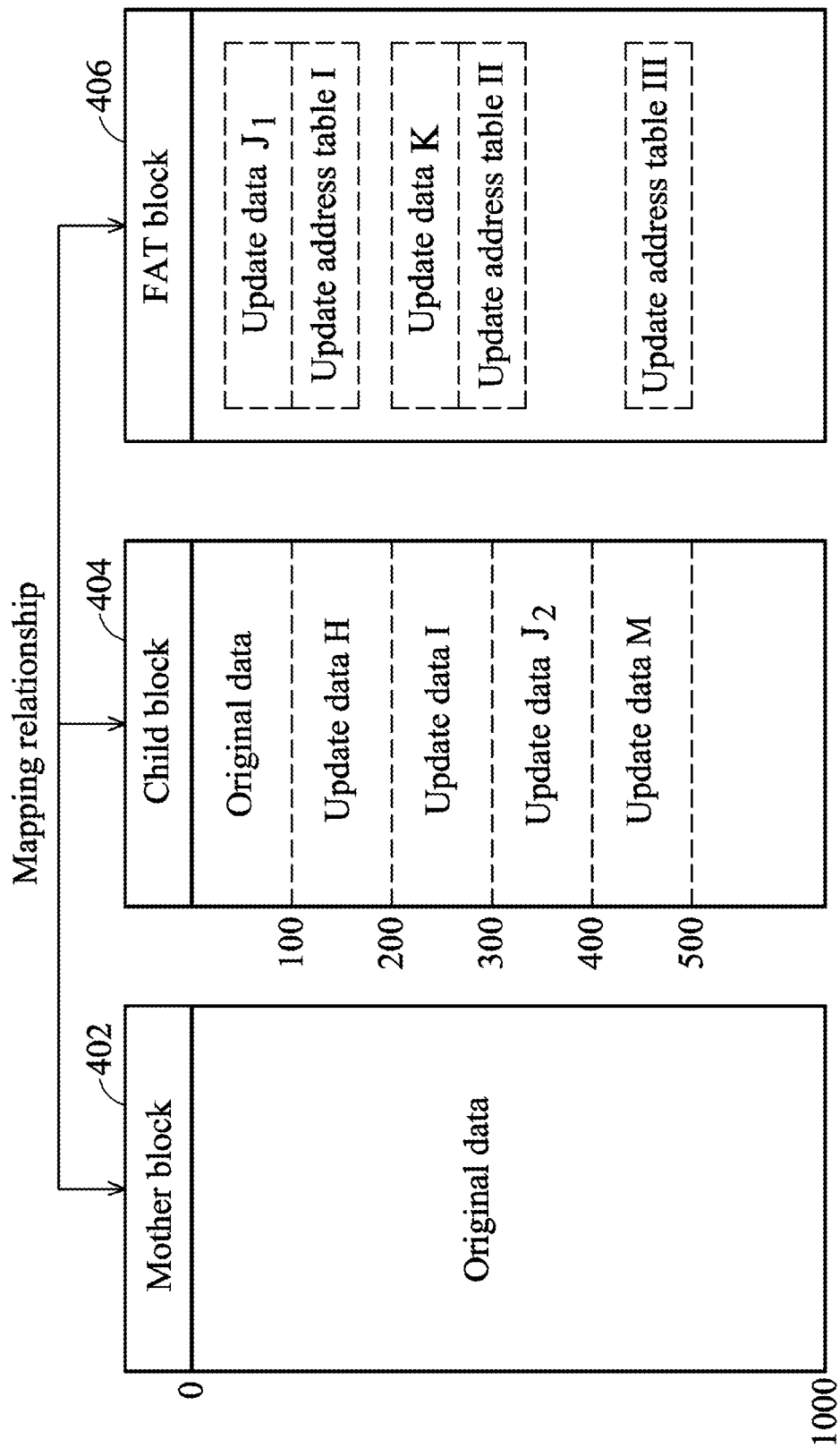
FIG. 4B is a schematic diagram of a mother block corresponding to the addresses of the write commands shown in FIG. 4A and a child block and an FAT block mapped to the mother block.

The data access method 300 can be further illustrated with embodiments of FIGS. 4A and 4B. Referring to FIG. 4A, an embodiment of a series of write commands sent from the host 202 to the flash storage device 204 is shown. Referring to FIG. 4B, a schematic diagram of a mother block 402 corresponding to the addresses of the write commands shown in FIG. 4A and a child block 404 and an FAT block 406 mapped to the mother block 402 is shown. The controller 212 first receives a write command 1 from the host 202, wherein the write command 1 requests the controller 212 to write update data H to an address range 101~200 of the flash memory 214. Assume that the mother block 402 has original data stored therein with an address range of 0~1000. The address range of the write command 1 therefore corresponds to the mother block 402. Because the address range 101~200 of the mother block 402 has original data stored therein, the controller 402 cannot directly write the update data H of the write command 1 to the mother block 402.

The mother block 402 initially does not have a corresponding child block and a corresponding FAT block. The controller 212 therefore selects a spare block from the flash memory 204 as the child block 404 mapped to the mother block 402, copies original data with an address range 0~100 to the child block 404, and then writes the update data H of the write command 1 to the address range 101~200 of the child block 404. and then the host 202 sends a write command 2 to the controller 212 to request the controller 212 to write update data I to the address range 201~300. Because the address range 201~300 of the mother block 402 has original data stored therein, the controller 212 cannot directly write the update data I to the mother block 402. Because the address range 201~300 follows a last address 100 for storing data in the child block 404, the controller 212 writes the update data I to the address range 201~300 of the child block 404.

The host 202 then sends a write command 3 to the controller 212 to request the controller 212 to write update data J to an address range 251~400, wherein the update data J is divided into update data $J_1$ with an address range 251~300 and update data $J_2$ with an address range 301~400. Because the address range 301~400 of the update data $J_2$ follows the last address 300 for storing data in the child block 404, the controller 212 writes the update data $J_2$ to the address range 301~400 of the child block 404. Because the address range 251~300 of the update data $J_1$ overlaps with the address range of the update data I stored in the child block 404, the controller 212 cannot write the update data $J_1$ into the child block 404. The controller 212 therefore selects a spare block from the flash memory 214 as an FAT block 406 mapped to the mother block 402, writes update data $J_1$ into the FAT block 406, and writes an update address table I comprising information about the update data $J_1$ into the FAT block 406.

The host 202 then sends a write command 4 to the controller 212 to request the controller 212 to write the update data K to an address range 451~500. Because the address range 451~500 of the update data K does not follow a last address 400 of the child block 404, the controller 212 does not write the update data K to the child block 404. Instead, the controller 212 writes the update data K to the FAT block 406, and writes an update address table II comprising information about the update data K into the FAT block 406. The host 202 then sends a write command 5 to the controller 212 to request the controller 212 to write the update data M to an address range 401~500. Because the address range 401~500 of the update data M follows a last address 400 of the child block 404, the controller 212 directly write the update data M to the child block 404. Because the update data K stored in the FAT block has an address range 451~500 overlapping with the address range 401~500 of the update data M, the controller 212 erases information about the update data K from the update address table II to obtain an update address table III, and writes the update address table III into the FAT block 406.

Referring to FIG. 5, an embodiment of an update address table 500 stored in a FAT block according to the invention is shown. The update address table stores a mapping relationship between physical addresses of original data stored in a mother block and physical addresses of all update data stored in the FAT block, wherein the update data is mapped to the original data. In one embodiment, the update address table 500 comprises two columns which are an original data address column and an update data address column. Assume that the FAT block storing the update address table 500 is mapped to a mother block with an address range 0~1000. The original data address column of the update address table 500 therefore records an address range 0~1000. The update data address column records the physical addresses of the update data mapped to the corresponding physical addresses of the original data. If the FAT block stores update data with a physical address Y, and the update data is mapped to the original data with the physical address X in the mother block, the original data address column of the update address table 500 records the address X of the original data in the mother block, and the corresponding update data address column of the update address table 500 records the address Y of the update data in the FAT block. For example, the original data with addresses 0~2 does not have corresponding update data in the FAT block, and the update data address column of the update address table 500 does not record addresses of the update data corresponding to the original data addresses 0~2. The original data with addresses 998 and 999 has corresponding update data with addresses 353 and 354 in the FAT block, and the update data address column of the update address table 500 records addresses 353 and 354 of the update data corresponding to the original data addresses 998 and 999. The controller 22 can therefore determine all physical addresses of the update data mapped to the original data of the mother block according to the update address table 500.

Figure 6:
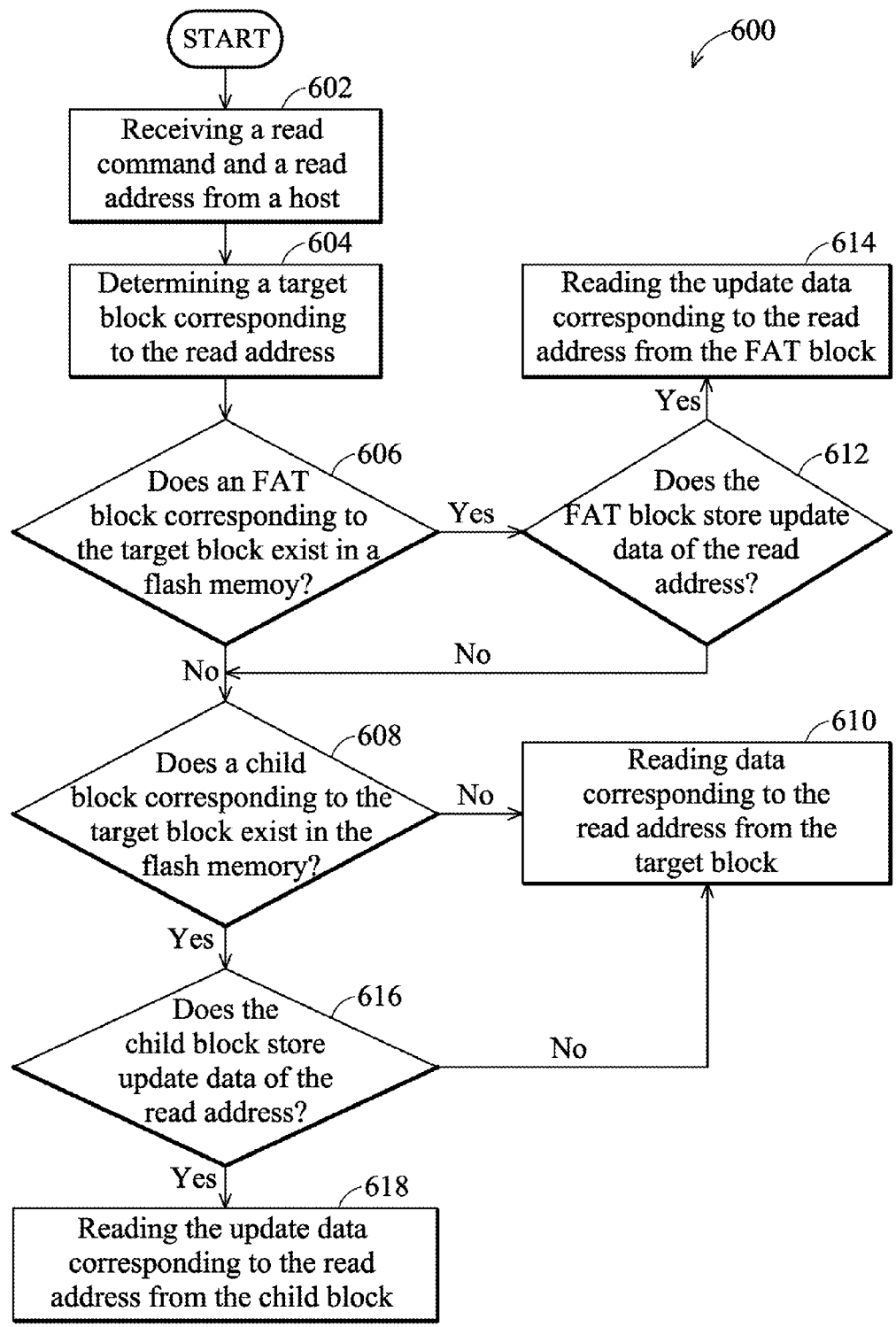
FIG. 6 is a flowchart of a data read method of a flash memory according to the invention.

Referring to FIG. 6, a flowchart of a data read method 600 of a flash memory according to the invention is shown. The controller 212 executes read commands received from the host 202 according to the method 600. First, the controller 212 receives a read command and a read address from the host 202 (step 602). The controller 212 then determines a target block corresponding to the read address from the flash memory 214 (step 604). The controller 212 then determines whether an FAT block mapped to the target block exists in the flash memory 214 (step 606). If so, the controller 212 determines whether the FAT block has update data of the read address stored therein (step 612). If so, the controller 212 reads the update data corresponding to the read address from the FAT block (step 614).

If the FAT block does not have update data stored therein corresponding to the read address (step 612), or the flash memory 214 does not comprise an FAT block mapped to the target block (step 606), the controller 212 further determines whether a child block mapped to the target block exists in the flash memory 214 (step 608). If so, the controller 212 further determines whether the child block has update data of the read address stored therein (step 616). If so, the controller 212 reads the update data corresponding to the read address from the child block (step 618). If the child block does not have update data corresponding to the read address stored therein (step 616), or the flash memory 214 does not comprise a child block mapped to the target block, the controller 212 directly reads data corresponding to the read address from the target block (step 610).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data access method of a flash memory, comprising:
  receiving a write command, a write address, and target data from a host;
  determining a target block corresponding to the write address from the flash memory;
  checking whether a storage space corresponding to the write address in the target block has stored data therein;

when the storage space of the target block does not have stored data therein, writing the target data into the storage space of the target block;

when the storage space of the target block does have stored data therein, checking whether a child block mapped to the target block exists in the flash memory;

when the child block exists in the flash memory, checking whether the write address follows a last address with stored data in the child block;

when the write address follows the last address, writing the target data into the child block;

when the write address does not follow the last address, checking whether a file allocation table (FAT) block mapped to the target block exists in the flash memory; and when the FAT block exists in the flash memory, writing the target data to the FAT block.

2. The data access method as claimed in claim 1, wherein the method further comprises:
when the child block does not exist in the flash memory, selecting a spare block from the flash memory as the child block mapped to the target block; and
writing the target data to the child block.

3. The data access method as claimed in claim 1, wherein the method further comprises:
when the FAT block does not exist in the flash memory, selecting a spare block from the flash memory as the FAT block mapped to the target block; and
writing the target data into the FAT block.

4. The data access method as claimed in claim 1, wherein writing of the target data to the FAT block comprises:
writing the target data to the FAT block; and
writing an update address table into the FAT block,
wherein the update address table records a mapping relationship between an original physical address of an original data stored in the target block and an update physical address of the target data stored in the FAT block, and both the original data and the target data logically correspond to the write address.

5. The data access method as claimed in claim 1, wherein writing of the target data to the child block comprises:
checking whether the FAT block mapped to the target block exists in the flash memory;
checking whether an update data logically corresponding to the write address is stored in the FAT block;
when the FAT block exists in the flash memory and the FAT block has the update data stored therein, erasing information about the write address from an update address table stored in the FAT block; and
writing the target data to a target storage space in the child block,
wherein the update address table records a mapping relationship between an original physical address of an original data stored in the target block and an update physical address of the update data stored in the FAT block, and both the original data and the update data logically correspond to the write address.

6. The data access method as claimed in claim 5, wherein the starting address of the target storage space follows a last address for storing data in the child block.

7. The data access method as claimed in claim 1, wherein the method further comprises:
receiving a read command and a read address from the host;
determining a read target block corresponding to the read address;
checking whether a read FAT block mapped to the read address exists in the flash memory;
when the read FAT block exists, checking whether first update data corresponding to the read address is stored in the read FAT block; and
when the first update data is stored in the read FAT block, reading the first update data from the read FAT block.

8. The data access method as claimed in claim 7, wherein the method further comprises:
when the read FAT block does not exist, or when the first update data is not stored in the read FAT block, checking whether a read child block mapped to the read target block exists in the flash memory; and
when the read child block does not exist, reading second update data from the read target block according to the read address.

9. The data access method as claimed in claim 8, wherein the method further comprises:
when the read child block exists, checking whether third update data corresponding to the read address is stored in the read child block;
when third update data is stored in the read child block, reading the third update data from the read child block; and
when the third update data is not stored in the read child block, reading the second update data from the read target block according to the read address.

10. A flash storage device, comprising:
a flash memory, comprising a plurality of blocks for data storage;
a controller, receiving a write command, a write address, and target data from a host, determining a target block corresponding to the write address from the flash memory, checking whether a storage space corresponding to the write address in the target block has stored data therein, writing the target data into the storage space of the target block when the storage space of the target block does not have stored data therein, checking whether a child block mapped to the target block exists in the flash memory when the storage space of the target block does have stored data therein, checking whether the write address follows a last address with stored data in the child block when the child block exists in the flash memory, writing the target data into the child block when the write address follows the last address, checking whether a file allocation table (FAT) block mapped to the target block exists in the flash memory when the write address does not follow the last address, and writing the target data to the FAT block when the FAT block exists in the flash memory.

11. The flash storage device as claimed in claim 10, wherein when the child block does not exist in the flash memory, the controller selects a spare block from the flash memory as the child block mapped to the target block, and writes the target data to the child block.

12. The flash storage device as claimed in claim 10, wherein when the FAT block does not exist in the flash memory, the controller selects a spare block from the flash memory as the FAT block mapped to the target block, and writes the target data into the FAT block.

13. The flash storage device as claimed in claim 10, wherein when the controller writes the target data to the FAT block, the controller also writes an update address table into the FAT block, wherein the update address table records a mapping relationship between an original physical address of an original data stored in the target block and an update physical address of the target data stored in the FAT block, and both the original data and the target data logically correspond to the write address.

14. The flash storage device as claimed in claim 10, wherein when the controller writes the target data to the child block, the controller checks whether the FAT block mapped to the target block exists in the flash memory, checks whether an update data logically corresponding to the write address is stored in the FAT block, erases information about the write address from an update address table stored in the FAT block if the FAT block exists in the flash memory and the FAT block has the update data stored therein, and writes the target data to a target storage space in the child block, wherein the update address table records a mapping relationship between an original physical address of an original data stored in the target block and an update physical address of the update data stored in the FAT block, and both the original data and the update data logically correspond to the write address.

15. The flash storage device as claimed in claim 14, wherein the starting address of the target storage space follows a last address for storing data in the child block.

16. The flash storage device as claimed in claim 10, wherein the controller further receives a read command and a read address from the host, determines a read target block corresponding to the read address, checks whether a read FAT block mapped to the read address exists in the flash memory, checks whether first update data corresponding to the read address is stored in the read FAT block when the read FAT block exists, and reads the first update data from the read FAT block when the first update data is stored in the read FAT block.

17. The flash storage device as claimed in claim 16, wherein when the read FAT block does not exist, or when the first update data is not stored in the read FAT block, the controller checks whether a read child block mapped to the read target block exists in the flash memory, and reads second update data from the read target block according to the read address if the read child block does not exist.

18. The flash storage device as claimed in claim 17, wherein when the read child block exists, the controller checks whether third update data corresponding to the read address is stored in the read child block, reads the third update data from the read child block if the read child block stores the third update data, and reads the second update data from the read target block according to the read address if the third update data is not stored in the read child block.

* * * * *